United States Patent
Held

(10) Patent No.: US 11,327,925 B2
(45) Date of Patent: May 10, 2022

(54) METHOD AND SYSTEM FOR DATA TRANSFER BETWEEN DATABASES

(71) Applicant: SAP SE, Walldorf (DE)

(72) Inventor: Dominik Held, Waghäusel (DE)

(73) Assignee: SAP SE, Walldorf (DE)

( * ) Notice: Subject to any disclaimer, the term of this patent is extended or adjusted under 35 U.S.C. 154(b) by 400 days.

(21) Appl. No.: 16/446,378

(22) Filed: Jun. 19, 2019

(65) Prior Publication Data

US 2020/0042495 A1 Feb. 6, 2020

(30) Foreign Application Priority Data

Aug. 3, 2018 (EP) ..................................... 18187385

(51) Int. Cl.
*G06F 16/11* (2019.01)
*G06N 20/00* (2019.01)
*G06F 40/30* (2020.01)

(52) U.S. Cl.
CPC ............ *G06F 16/119* (2019.01); *G06F 40/30* (2020.01); *G06N 20/00* (2019.01)

(58) Field of Classification Search
None
See application file for complete search history.

(56) References Cited

U.S. PATENT DOCUMENTS 5,255,371 A * 10/1993 Latimer ................ G06F 13/126
710/5
2012/0221509 A1 8/2012 Gao et al.
2014/0129942 A1 * 5/2014 Rathod ............ H04N 21/44222
715/720
2015/0106381 A1 4/2015 Gerstl et al.
2018/0232663 A1 * 8/2018 Ross ...................... G06N 3/105

FOREIGN PATENT DOCUMENTS

WO WO-2018/051096 A1 3/2018

OTHER PUBLICATIONS

European Search Report, dated Jan. 17, 2019, for European Patent Application No. 18187385.2, 10 pages.

* cited by examiner

*Primary Examiner* — Thu N Nguyen
(74) *Attorney, Agent, or Firm* — Sterne, Kessler, Goldstein & Fox P.L.L.C.

(57) ABSTRACT

Disclosed herein are system, method, and computer program product embodiments for modular fragmentation and messaging across different web applications. An example system may include at least one computer processor, a memory, and a first database, the first database comprising a first procedure specification of at least one first procedure, and a first data field configured to store a data item, the first data field comprising a first logical link within a first data structure of the first database, the first logical link comprising a respective first set of first link specifications, and the first procedure being configured to retrieve the data item stored in the first data field upon execution by the processor. Semantic links between procedure specifications may be determined from matches with logical links. A linked data item stored in one field may be transferred to another field that has a matching logical link.

15 Claims, 5 Drawing Sheets

FIG. 5

| 400 Plurality of data fields storing data items to be transferred | |
|---|---|
| 401 First set of the plurality of data fields each having the first link | 402 Second set of the plurality of data fields each having the second link |
| 403 First subset of the first set of the plurality of data fields each having the first link and the third link | 405 First subset if the second set of the plurality of data fields each having the second link and the fifth link |
| 404 Second subset of the first set of the plurality of data fields each having the first link and the fourth link | 406 First subset if the first set of the plurality of data fields each having the second link and the sixth link |

FIG. 6

| Data Field | Table | | | Parent-child relationship | Data domain | Foreign key relationship | | | | Primary key relationship | | | | Procedure | | | |
|---|---|---|---|---|---|---|---|---|---|---|---|---|---|---|---|---|---|
| | Row | Column | Table | | | Data field | Row | Column | Table | Data field | Row | Column | Table | Procedure | Application | Supplier | Software package |
| DF 213 | 241 | 233 | 200 | 250 | | | | | | | | | | | | | |
| DF 202 | 241 | 232 | 200 | 250 | 227 | DF 251 | 291 | 281 | 250 | DF 201 | 241 | 231 | 200 | 1 | 1 | 1 | 1 |

METHOD AND SYSTEM FOR DATA TRANSFER BETWEEN DATABASES

CROSS-REFERENCE TO RELATED APPLICATIONS

This application claims priority to European Patent Application No. 18187385.2, filed Aug. 3, 2018, the entirety of which is incorporated herein by reference.

TECHNICAL FIELD

This invention relates to computer systems for data transfer between databases. In particular, this invention relates to the transfer of data items and related functionalities.

BACKGROUND

Different databases became ubiquitous element of almost any modern technology. There are a lot of different databases designed by different companies for different purposes. As a result thereof, there are a lot of different solutions for addressing similar problems and/or processing similar data. Development of a specialized solution for a particular problem has a clear advantage, because it can operate very fast within its application domain. On the other hand, integrating of different customized databases requires specialized procedures for data transfer between the databases. The integration issues can diminish the superior performance of the customized databases operating as standalone systems. The negative impact of integration issues can be more prominent, when one of the databases to be integrated is a legacy one, which uses substantially different data formats and/or communication protocols in comparison with the modern ones. In addition the data transfer between databases can be further complicated due to different functionalities of the databases.

SUMMARY

The disclosure generally a computer-implemented method for data structure transfer to a computer system, a computer-readable media storing computer executable instructions for executing the computer-implemented method, a computer program comprising instructions to execute the computer-implemented method, and a computer system for data structure transfer to a computer system.

It is an objective of embodiments of the invention to provide for a computer-implemented method, a computer-readable media storing computer executable instructions for executing the computer-implemented method, a computer program comprising instructions to execute the computer-implemented method, and a computer system for an effective data structure and functionality transfer between database systems. The objective is addressed in the independent claims, whereas the preferred embodiments are given in the dependent claims.

According to one aspect, the present invention relates to a computer system, comprising a computer processor, a memory, and a first database. The first database comprises first procedure specifications of first procedures and a plurality of first data fields for storing data items. The first data fields have first logical links within a first data structure of the first database. Each of the first logical links has a respective first set of first link specifications. The first procedures are configured to use the data items stored in the first data fields upon execution by the processor. The memory comprises computer executable code which when executed by the computer processor causes the computer processor to control the computer system to: receive a second data structure of the second database and second procedure specifications of second procedures, the second data structure comprising a plurality of second data fields storing data items, the second data fields having second logical links within a second data structure of the second database, each of the second logical links having a respective second set of second link specifications, wherein the second procedures are configured to use the data items stored in the second data fields upon execution by a computer processor configured to control the second database; identify second data fields in the second data structure each having the same second logical link and being semantically linked to a same third set of the second procedure specifications; identify first data fields in the first database each having the same first logical link and being semantically linked to a same fourth set of the first procedure specifications, wherein each of some of the second procedure specifications of the third set matches the respective first procedure specification of the fourth set, wherein each of some of the first link specifications of the first set of the first link specifications of the first logical link of the identified first data fields matches a respective second link specification of the second set of the second link specifications of the second logical link of the identified second data fields; and transfer data items stored in the identified second data fields to the identified first data fields.

According to another aspect, the present invention relates to a computer-implemented method for data structure transfer to a computer system comprising a first database. The first database comprising first procedure specifications of first procedures and a plurality of first data fields for storing data items. The first data fields have first logical links within a first data structure of the first database. Each of the first logical links having a respective first set of first link specifications. The first procedures are computer executable procedures using the data items stored in the first data fields. The computer-implemented method comprises: receiving a second data structure of the second database and second procedure specifications of second procedures, the second data structure comprising a plurality of second data fields storing data items, the second data fields having second logical links within a second data structure of the second database, each of the second logical links having a respective second set of second link specifications, wherein the second procedures are computer executable procedures using the data items stored in the second data fields; identifying second data fields in the second data structure each having the same second logical link and being semantically linked to a same third set of the second procedure specifications; identifying first data fields in the first database each having the same first logical link and being semantically linked to a same fourth set of the first procedure specifications, wherein each of at least some of the second procedure specifications of the third set matches the respective first procedure specification of the fourth set, wherein each of at least some of the first link specifications of the first set of first link specifications of the first logical link of the identified first data fields matches a respective second link specification of the second set of second link specifications of the second logical link of the identified second data fields; and transferring data items stored in the identified second data fields to the identified first data fields.

According to another aspect, the present invention relates to a computer readable medium having stored thereon a computer executable code for execution by a computer processor controlling a computer system, wherein execution of the instructions of the executable code causes the computer processor to control the computer system to execute the computer-implemented method of the aforementioned embodiment.

According to another aspect, the present invention relates to a computer program comprising instructions to execute the computer-implemented method according to the aforementioned embodiment.

These embodiments can be advantageous because they may enable effective transfer of the data structure from the second database to the first database. The data structure transfer includes an integral transfer of the data items stored in the second database in relation to the logical links of the data fields in the second data structure and second operation specifications of the second database. This approach can be called a plug-and-play one, because upon completion of the transfer the first data structure has at least some of the logical links and functionalities of the original second data structure. The data structure is based on advantageous extraction of information of the second database, wherein not only the logical links but the semantic ones are taken into account.

In another embodiment, the computer system comprises a first trained machine learning, ML, module for identifying data fields in a data structure of one database having procedure specifications using one or more logical links of another database and one or more procedure specifications of the other database, wherein the identifying of the first data fields is executed by the first trained ML module using the third set and the second logical link which the identified second data fields have.

This embodiment may be advantageous because it may provide for an effective identification of the first data fields in the first database using information extracted from the second database. This solution is supported by the fact that despite big diversity of the database solutions the specifications of the logical links and/or the procedures are formulated well-recognized terms of art, which have the same meaning and refer to the same functionalities in various database solutions. As a result thereof, typical problems occurring in ML translation of literature texts are not relevant for this embodiment. For instance, one word or term of art in the original literature text can be translated using a plurality of synonyms in the translation. In contrast, the one-to-one correspondence of the terms of art used in different databases can enable precise identification of logical links and semantic links corresponding each other in different databases.

In another embodiment, the computer system comprises a second trained ML module for identifying data fields in a database each having a same logical link and a semantic link to a same set of procedure specifications, wherein the identifying of the second data fields is performed by the second trained ML module using the second procedure specifications and the second sets of second link specifications.

At is it is mentioned above the precise meaning and utilization of terms of art in databases may provide for high fidelity of the results generated by the ML modules. In addition, the ML module can be trained such, that it provides optimal size of blocks of the identified data fields storing data items which are transferred together in the step of the transferring of data items stored in the identified second data fields to the identified first data fields. The data fields identified in one step might still have other different logical and/or semantic links which are not relevant for the transfer step. When these irrelevant links are taken into account, less second data fields are identified in a single step and as a consequence several iterations are required instead a single one to transfer the data items from the second database to the first database.

In another embodiment, the computer system comprises a procedure pool of auxiliary procedures for data and functionality transfer to the first data base, wherein the execution of the computer executable code by the computer processor further causes the computer processor to control the computer system to: execute one or more auxiliary procedures for modifying first procedure specifications, wherein the one or more auxiliary procedures are identified in the procedure pool using one or more of the second procedure specifications comprised in the third set and having no matching first procedure specifications in the fourth set and one or more of the first procedure specifications comprised in the fourth set and having no matching second procedure specifications in the third set; and/or execute one or more other auxiliary procedures for modifying first link specifications, wherein the one or more other auxiliary procedure are identified in the procedure pool using one or more of the second link specifications comprised in the second set of the second link specifications of the second logical link of the identified second data fields and having no matching first link specifications comprised in the first set of the first link specifications of the first logical link of the identified first data fields and one or more of the first link specifications comprised in the first set of the first link specifications of the first logical link of the identified first data fields and having no matching second link specifications comprised in the second set of the second link specifications of the second logical link of the identified second data fields. The aforementioned computer-implemented method can comprise steps corresponding to these functionalities as well.

This embodiment can be advantageous, because it may provide for a further improvement of the fidelity of the data structure transfer. Moreover, these procedures may be completed within a short time interval, because the logical links and the procedure specifications are modified using auxiliary procedures which are selected from the pool of the auxiliary procedures which are already available in the computer system.

In another embodiment, the computer system comprises a third trained ML module for identifying one or more auxiliary procedures for modifying first procedure specifications using one or more procedure specifications as original specifications and one or more procedure specifications as target specifications, wherein the one or more auxiliary procedures are identified by the third trained ML module using one or more of the second procedure specifications comprised in the third set and having no matching first procedure specifications in the fourth set as target specifications and one or more of the first procedure specifications comprised in the fourth set and having no matching second procedure specifications in the third set as source specifications.

In addition to the aforementioned advantages of utilization of the ML for data structure transfer the utilization of ML in this embodiment may provide for a correct and fast identification of the right auxiliary procedure.

In another embodiment, the computer system comprises a fourth trained ML module for identifying one or more auxiliary procedures for modifying first link specifications using one or more link specifications as original specifications and one or more link specifications as target specifications, wherein the one or more other auxiliary procedures are identified by the fourth trained ML module using one or more of the second link specifications comprised in the second set of the second link specifications of the second logical link of the identified second data fields and having no matching first link specification comprised in the first set of the first link specifications of the first logical link of the identified first data fields as target specification and one or more of the first link specifications comprised in the first set of the first link specifications of the first logical link of the identified first data fields and having no matching second link specifications comprised in the second set of the second link specifications of the second logical link of the identified second data fields as source specifications.

This embodiment can be advantageous, because as it is mentioned above the ML may provide for a correct and fast identification of the right auxiliary procedure.

In another embodiment, the computer system comprises a procedure pool of auxiliary procedures for data and functionality transfer to the first data base. The transferring of the data items stored in the identified second data fields to the identified first data fields comprises: retrieving one or more of the data items stored in the identified second data fields; executing an auxiliary procedure for modifying a data format of the retrieved one or more data items, wherein the auxiliary procedure is identified in the procedure pool by comparing a data format used in the identified second data fields for storing the one or more data items with a data format used in the identified first data fields for storing the one or more data items; and storing the one or more data items having the modified data format in the identified first data fields.

This embodiment can be advantageous, because it may provide for a better flexibility and efficiency of the data structure transfer. Data fields of the first database which have the matching logical link and the procedure specification may be used for the storing the data items of the second database having an original data format being incompatible with the identified first data fields. Without this functionality, not only generation of new data fields for storing data items having the original data format but further modification of the logical links and/or procedures of the second database might be required.

In another embodiment, the computer system comprises a fifth trained ML module for identifying auxiliary procedures for modifying data format of data items by using source and target data formats as input for format comparison, wherein the auxiliary procedure is identified by the fifth trained ML module using the data format used in the identified second data fields for storing the one or more data items and the data format used in the identified first data fields for storing the one or more data items as input for format comparison.

This embodiment can be advantageous, because as it is mentioned above the ML may provide for a correct and fast identification of the right auxiliary procedure.

In another embodiment, the first data structure comprises first electronic tables comprising the first data fields, wherein some the first electronic tables are linked by parent child relationships with each other, wherein some of the first data fields are linked by primary key relationships, wherein some of the first data fields are linked by foreign key relationships, wherein some of the first data fields are assigned to a respective first data domain within the first data structure, wherein some of the first data domains have the assigned first data fields which are comprised in different first electronic tables, wherein each of the first sets of first link specifications comprises at least one of the following first link specifications of the first logical link of the respective first data field: a) a foreign key relationship between the respective first data field and another one of the first data fields; b) a primary key relationship between the respective first data field and another one of the first data fields; c) a domain specification of a first data domain to which the respective first data field is assigned; d) a parent-child relationship specification of a parent-child relationship between one of the first electronic tables being a child in the parent-child relationship and another one of the first electronic tables comprising the respective first data field; e) a table specification of the first electronic table comprising the respective first data field; f) a row specification of a row of the first electronic table, wherein the row of the first electronic table comprises the respective first data field; g) a column specification of a column of the first electronic table, wherein the column of the first electronic table comprises the respective first data field.

In another embodiment, the second data structure comprises second electronic tables comprising the second data fields, wherein some of the second electronic tables are linked by parent child relationships with each other, wherein some of the second data fields are linked by primary key relationships, wherein some of the second data fields are linked by foreign key relationships, wherein some of the second data fields are assigned to a respective second data domain within the second data structure, wherein each of some of the second data domains having the assigned second data fields which are comprised in different second electronic tables, wherein each of the second sets of second link specifications comprises at least one of the following second link specifications of the second logical link of the respective second data field: a) a foreign key relationship between the respective second data field and another one of the second data fields; b) a primary key relationship between the respective second data field and another one of the second data fields; c) a domain specification of a second data domain to which the respective second data field is assigned; d) a parent-child relationship specification of a parent-child relationship between one of the second electronic tables being a child in the parent-child relationship and another one of the second electronic tables comprising the respective second data field; e) a table specification of the second electronic table comprising the respective second data field; f) a row specification of a row of the second electronic table, wherein the row of the second electronic table comprises the respective second data field; g) a column specification of a column of the first electronic table, wherein the column of the first electronic table comprises the respective first data field.

These embodiments can be advantageous, because it may provide for the specifications of the logical links which are customary in many databases. Thus, finding matching logical links in different databases may become a straightforward procedure.

In another embodiment, for any of the first link specifications and any of the second link specifications matching each other at least one of the following criteria is complied with: a) the first link specification specifies a foreign key relationship between a first pair of the first data fields and the second link specification specifies a foreign key relationship between a second pair of the second data fields, wherein a column comprising one of the first data fields of the first pair and a column comprising one of the second data fields of the second pair have matching specifications, a column comprising another one of the first data fields of the first pair and a column comprising another one of the second data fields of the second pair have matching specifications, wherein the columns comprising the first pair are comprised in the different first electronic tables and the columns comprising the second pair are comprised in the different second electronic tables; b) the first link specification specifies a primary key relationship between a third pair of the first data fields and the second link specification specifies a primary key relationship between a fourth pair of the second data fields, wherein a row comprising the third pair and a row comprising the fourth pair have matching specifications, wherein the row comprising the third pair is comprised in one of the first electronic tables and the row comprising the fourth pair is comprised in one of the second electronic tables; c) the first link specification specifies that one of the first data fields is assigned to one of the first data domains and the second link specification specifies that that one of the second data fields is assigned to one of the second data domains, wherein the one of the first data domains and the one of the second data domains have matching specifications; d) the first link specification specifies a parent-child relationship between a pair of the first electronic tables and the second link specification specifies a parent-child relationship between a pair of the second electronic tables, wherein the first electronic table of the pair being a parent in the parent-child relationship and the second electronic table of the pair being a parent in the parent-child relationship have matching specifications and the first electronic table of the pair being a child in the parent-child relationship and the second electronic table of the pair being a child in the parent-child relationship have matching specifications; e) one of the first electronic tables specified in the first link specification and one of the second electronic tables specified in the second link specification have matching specifications; f) a row of one of the first electronic table specified in the first link specification and a row of one of the second electronic tables specified in the second link specification have matching specifications; g) a column of one of the first electronic table specified in the first link specification and a column of one of the second electronic tables specified in the second link specification have matching specifications.

This embodiment can be advantageous, because it may provide for a standardized approach for identification of the matching links. The standard features used in different database systems have (as usual) standardized characteristics, which comparison may be computer-implemented.

In another embodiment, the first data fields are assigned to first computer applications executable using the first database, the first procedures are assigned to the first computer applications, wherein the first procedure specifications comprise first source codes of the first procedures and first descriptions of the first procedures, wherein any of the first data fields having a semantic link to any arbitrary set of first procedure specifications has a respective semantic link to each of the first procedure specifications of the any arbitrary set, wherein for any of the first data fields and any of the first procedure specifications having a semantic link at least one of the following criteria is compiled with: a) the first data field is used in the first source code comprised in the first procedure specification; b) the first data field is used in the first description comprised in the first procedure specification; and c) the first data field and the first procedure having the first procedure specification are assigned to the same first computer application.

In another embodiment, the second data fields are assigned to second computer applications executable using the first database, the second procedures are assigned to the second computer applications, wherein the second procedure specifications comprise second source codes of the second procedures and second descriptions of the second procedures, wherein any of the second data fields having a semantic link to any arbitrary set of second procedure specifications has a respective semantic link to each of the second procedure specifications of the any arbitrary set, wherein for any of the second data fields and any of the second procedure specifications having a semantic link at least one of the following criteria is compiled with: a) the second data field is used in the second source code comprised in the second procedure specification; b) the second data field is used in the second description comprised in the second procedure specification; and c) the second data field and the second procedure having the second procedure specification are assigned to the same second computer application.

These embodiments can be advantageous, because the sematic links are based on information which is available almost in any database. There are plenty of data which can be used for determination of semantic links, e.g. database manuals, texts of help functions, comments in source code, names of standard functions in source code, at least some of the electronic tables and fields have standard and/or the same names in different databases, and source code as such, because it is written using symbols of a programming language having meanings as specified in the description of the programming language.

In another embodiment, the first source codes specify execution of first database functions of the first database using the first data fields and/or data items stored in the first data fields, wherein the first descriptions describe the first database functions, wherein the second source codes specify execution of second database functions of the second database using the second data fields and/or data items stored in the second data fields, wherein the second descriptions describe the second database functions, wherein for any of the first procedure specifications and any of the second procedure specifications matching each other at least one of the following criteria is fulfilled: a) the first database function which execution is specified by the first source code comprised in the first procedure specification and the second database function which execution is specified by the second source code comprised in the second procedure specification have matching specifications; b) the first database function described in the first description comprised in the first procedure specification and the second database function described in the second description comprised in the second procedure specification have matching specifications; and c) the first computer application to which the first procedure having the first procedure specification is assigned and the second computer application to which the second procedure having the second procedure specification is assigned have matching specifications.

This embodiment can be advantageous because the matching of the semantic links is based on standard information which is ubiquitous almost in any database. For instance, the procedure specifications used in criterion a) can be written in the same programming language. Finding matching specifications can be based on comparison on the software source code operands, functions, subroutines, etc. When the procedure specifications are written in different programming languages, then lists of corresponding operands, functions, subroutines of different programming languages can be used. The matching specifications used in criterion b) can be based on comparison of keywords used the procedure specifications (e.g. procedure specifications in database manuals). The matching of application specifications used in criterion c) can be the same names of the applications like "Banking," "Logistics," etc. Alternatively or in addition, the matching can be determined on a basis of descriptions of the applications. For instance, the applications can have matching specifications when their descriptions have predefined keywords in common.

In another embodiment, wherein the first and/or the second procedures are formulated using one or more object oriented programming languages.

This embodiment can be advantageous, because the object oriented programming languages are high level programming languages, which source code is as usual straightforward to adapt/modify, which might be an advantage when the changes in the source code are to be executed by the computer without human assistance and/or control. The object oriented programming language can be for instance any of the following: python, C++, JAVA, and ABAP OO.

In another embodiment, the execution of the computer executable code by the computer processor further causes the computer processor to control the computer system to: receive reference result data generated on the second database by executing one or more of the second procedures using data items which are identical to the data items transferred to the identified first data fields; identify, for each of the one or more of the second procedures, the first procedure having the first procedure specification which matches the second procedure specification of the each of the one or more of the second procedures; generate test result data on the first database by executing the identified one or more of the first procedures using said data items transferred to the identified first data fields; and compare the reference result data with the test result data. The aforementioned computer-implemented method can comprise steps corresponding to these functionalities as well.

This embodiment can be advantageous, because it may provide for an effective procedure for checking whether the data structure transfer is completed in a correct way. The checking of data transfer may include not only the checking of the correctness of the transfer of the data items, but the checking of correctness of the transfer/modification of the logical link specifications and/or the procedure specifications, in particular source code.

In another embodiment, the execution of the computer executable code by the computer processor further causes the computer processor to control the computer system to: split a plurality of at least some of the second procedure specifications in disjoint specification sets, wherein one of the disjoint specification sets constitutes said third set and other disjoint specification sets constitute other third sets; identify, for each of the third sets, a data field set of the second data fields each being semantically linked to the each of the third sets; and split each of the data field sets in disjoint data field sets, wherein any second data field of each of the disjoint data field sets has the same respective second logical link assigned to the each of the disjoint data field sets, wherein the identifying of the second data fields is comprised in the splitting of the each of the data field sets in the disjoint data field sets, wherein one of the disjoint data field sets constitutes the identified second data fields. The aforementioned computer-implemented method can comprise steps corresponding to these functionalities as well.

This embodiment can be advantageous, because it may provide for an effective splitting of the data fields in sets, wherein data items stored in each of the sets can be transferred to the first database in a single step, e.g. iteratively. In addition the selection of the procedure specifications for generation of the specification sets may determine a portion of the data items which have to be transferred in a particular step (iteration). As a result thereof the transfer of each portion can be executed and optimized independent of the other portions. Such an approach may facilitate debugging of the transferred data structure, because each transferred portion can be debugged immediately after its transfer independently of the other ones. This embodiment can have further advantage for transferring of the data structures of databases, wherein the semantic links provide for a better initial splitting of the data fields than the initial splitting using the logical links, e.g. the initial splitting using the semantic links results in larger sets of the data fields than the initial splitting using the logical links. For instance, the initial splitting of the data fields using their semantic links determining links to the computer applications might result in larger sets of the data fields in comparison with the initial splitting of the data fields using their logical links determining parent-child relationships between the electronic tables comprising the data fields to be split.

In another embodiment, the execution of the computer executable code by the computer processor further causes the computer processor to control the computer system to: identify, for each of some of the second logical links, a data field set of the second data fields each having the each of some of the second logical links, wherein the data field sets are disjoint sets; identify for each of the data field sets a respective plurality of the second procedure specifications each being semantically linked to at least one of the second data fields of the each of the data field sets, split each of the pluralities of the procedure specifications in disjoint specification sets of the second procedure specifications, wherein one of the disjoint specification sets constitutes said third set and other disjoint specification sets constitute other third sets; and split each of the data field sets in disjoint data field sets, wherein any second data field of each of the disjoint data field sets is semantically linked to the respective third set, wherein the identifying of the second data fields is comprised in the splitting of the each of the data field sets in the disjoint data field sets, wherein one of the disjoint data field sets constitutes the identified second data fields. The aforementioned computer-implemented method can comprise steps corresponding to these functionalities as well.

This embodiment can be advantageous because it may provide for an effective splitting of the data fields in sets in a similar way as the previous embodiment, i.e. it can provide for sequential/iterative transferring of data items comprised in the sets of the data fields. This embodiment can have further advantage for transferring of the data structures of databases, wherein the logical links provide for a better initial splitting of the data fields than the initial splitting using the logical links, e.g. the initial splitting using the logical links results in larger sets of the data fields than the initial splitting using the semantic links. For instance, the initial splitting of the data fields using their logical links determining links to the data domains might result in larger sets of the data fields in comparison with the initial splitting of the data fields using their semantic links determining comprisal of the data fields in the procedure specifications.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5 shows an example splitting of data fields in sets and their subsets.

FIG. 6 shows an example table summarizing data determining semantic and logical links of the data fields.

DETAILED DESCRIPTION

This disclosure generally describes computer-implemented methods, computer-readable media embodying computer executable instructions for execution the computer-implemented method, computer programs comprising instructions to execute the computer-implemented method, and computer systems for controlling electromechanical medical devices. The computer system can be stand-alone hardware unit, a cluster of computer systems, or it can be deployed in a computer cloud and use hardware and software resources of the computer cloud. Any of these systems are configured to execute a database and communicate with the other database computer systems via one or more computer systems. The following description is presented to enable any person skilled in the art to practice the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

Figure 1:
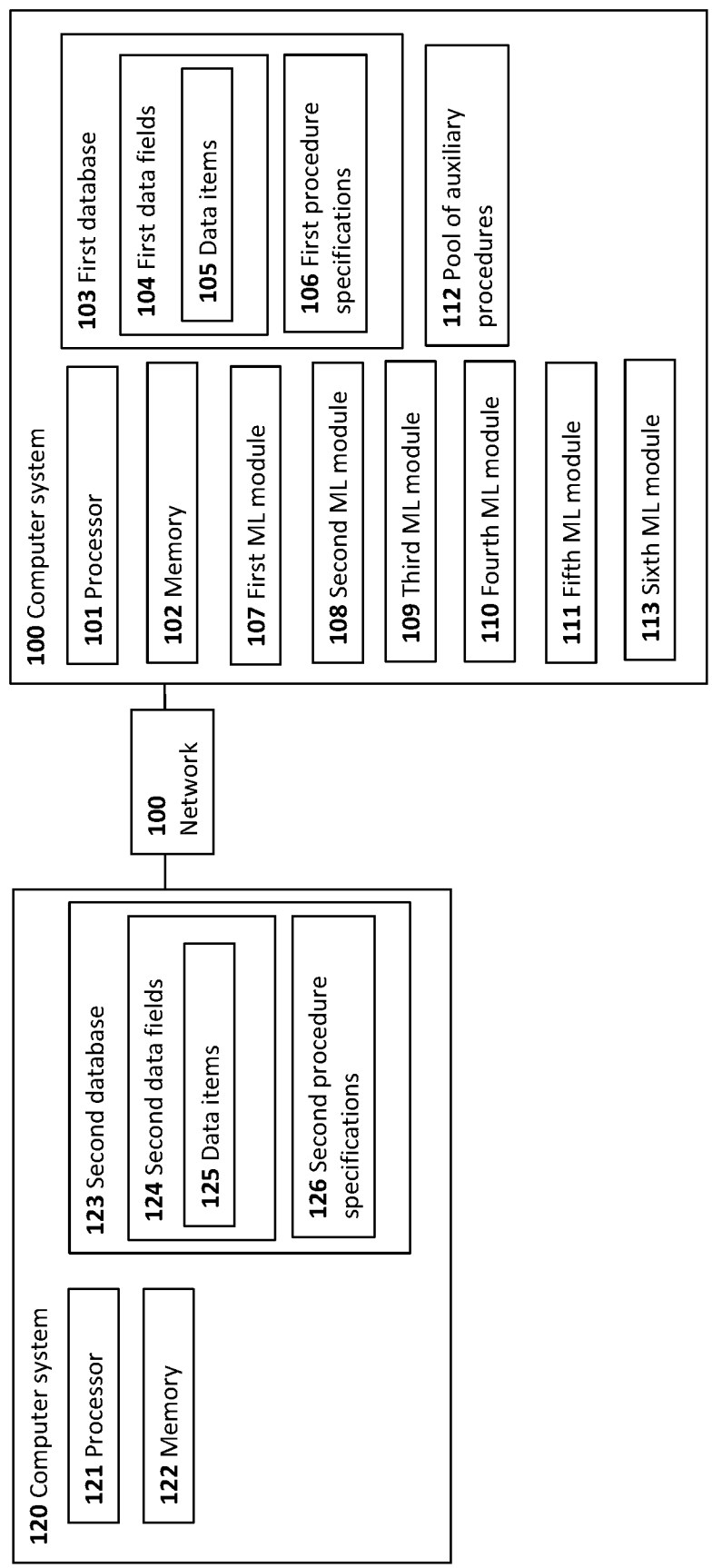
FIG. 1 is a block diagram illustrating an example computer environment, wherein the data structure can be executed.

FIG. 1 illustrates an example environment for transfer of data structures from a second computer system 120 to a first computer system 100. The first and the second computer system can be stand-alone hardware computer systems and/or clusters of hardware computer systems. The first and the second computer system or at least some of their components can be deployed in computer clouds and use their hardware and software resources. The first computer system 100 comprises a first processor 101 configured to control the first computer system 100. The control of the first computer system can be performed by the first processor 101 executing computer executable instructions stored in a first memory 102 comprised in the first computer system 100. The first processor 101 executing the instructions controls the first computer system 100 to execute the computer-implemented methods described herein. The first computer system comprises further a first database 103, a pool of auxiliary computer-executable procedures 112, and machine learning (ML) modules. The ML modules can be configured to facilitate/execute processes related to the data structure transfer. In this particular example the computer system 100 comprises at least 6 ML modules: first ML module 107, second ML module 108, third ML module 109, fourth ML module 110, fifth ML module 111, and sixth ML module 113. The pool of the axillary computer-executable procedures comprises procedures for data and functionality transfer to the first database. The first database 103 comprises first data fields 104 for storing data items 105 and first procedure specifications 106 of first procedures executable on the first database. The first procedures are configured to use the data items stored in the first data fields upon execution by the processor 101. The first procedures can be stored procedures being objects of the first database. The first procedure specifications comprise first source codes of the first procedures and first descriptions of the first procedures. As option each of the first procedure specifications comprises the respective first source code of the each of the first procedures and the respective first description of the each of the first procedures. The first source codes specify execution of first database functions of the first database using the first data fields and/or data items stored in the first data fields, wherein the first descriptions describe the first database functions. For instance the first source codes can be sets or sequences of the first database functions. The first database functions can comprise Boolean, mathematical and CRUD functions (operations) such as create, retrieve, update, delete. The first database 103 and/or computer-executable codes of the auxiliary computer-executable procedures of the pool 112, and/or the computer/executable codes of the ML modules can be stored in the first memory 102.

The second computer system 120 comprises a second processor 121 configured to control the second computer system 120. The control of the second computer system 120 can be performed by the second processor 121 executing computer executable instructions stored in a second memory 122 comprised in the second computer system 120. The second processor 121 executing the instructions controls the second computer system 120 to execute the computer-implemented methods described herein. The second computer system comprises further a second database 123. The second database 123 comprises second data fields 124 for storing data items 125 and second procedure specifications 126 of second procedures executable on the second database. The second procedures are configured to use the data items stored in the second data fields upon execution by the second processor 120. The second procedures can be stored procedures being objects of the second database. The second procedure specifications comprise second source codes of the second procedures and second descriptions of the second procedures. As option each of the second procedure specifications comprises the respective second source code of the each of the second procedures and the respective second description of the each of the second procedures. The second source codes specify execution of second database functions of the second database using the second data fields and/or data items stored in the second data fields, wherein the second descriptions describe the second database functions. For instance the second source codes can be sets or sequences of the second database functions. The second database functions can comprise Boolean, mathematical and CRUD functions (operations) such as create, retrieve, update, delete. The second database 123 can be stored in the second memory 122. The first computer system and the second computer system are communicatively coupled with each other, e.g. via one or more computer networks 100.

The first database can be relational database. The first data fields have first logical links within a first data structure of the first database. Each of the first logical links has a respective set of first link specifications. The second database can be a relational database. The second data fields have second logical links within a second data structure of the first database. Each of the second logical links has a respective set of second link specifications. Since the following description applies for both the first and the second logical links and both the first and the second data fields, the terms "logic link," "data field," "data structure, "electronic table," data domain," "set," "link specification" designate the respective terms related to the first database and the respective terms related to the second database.

The data structure comprises electronic tables comprising data fields. Each of the electronic tables comprises at least one row of data fields and at least one column of data fields. Each of some of the electronic tables comprises more than one row of data fields and/or more than one column of data fields. Each of the data field or the sets of the data fields (e.g. a column or a row of the electronic table) can have a respective data format for storing data items (e.g. format for storing integer values, format for storing real values, format for storing Boolean values, format for storing text data, etc.). Some of the electronic tables can be linked by parent-child relationships with each other. Some of the data fields can be linked by primary key relationships. Data items stored in data fields of a row linked by the primary key relationship provide for a unique identification of said row. Some of the data fields can be linked by foreign key relationships. The foreign key relationships specify logical links between data fields comprised in different electronic table. The foreign key relationship of data fields comprised in different rows of different electronic tables indicates that data items stored in these data fields constitute related information. Some of the data fields are assigned to a respective data domain. Some of the electronic data domains have assigned data fields, which are comprised in different electronic tables. For instance, a data domain can have assigned data fields which are used by a particular computer application using the database, another data domain can have assigned data fields which are used by a particular procedure, yet another data domain can have assigned data fields which are used for storing data items generated within a particular time interval. Each of the sets of link specifications comprises at least one of the following link specifications of the logical link of the respective data field:

a) a foreign key relationship between the respective data field and another one of the data fields;

b) a primary key relationship between the respective data field and another one of the data fields;

c) a domain specification of a data domain to which the respective data field is assigned;

d) a parent-child relationship specification of a parent-child relationship between one of the electronic tables being a child in the parent-child relationship and another one of the electronic tables comprising the respective data field;

e) a table specification of the electronic table comprising the respective data field;

f) a row specification of a row of the electronic table, wherein the row of the electronic table comprises the respective data field; and g) a column specification of a column of the electronic table, wherein the column of the electronic table comprises the respective data field.

The domain specification can comprise a domain name and/or a domain description. The table specification can comprise a table name and/or a table description. The column specification can comprise a column name and/or a column description. The row specification can comprise a row name and/or a row description.

Figure 2:
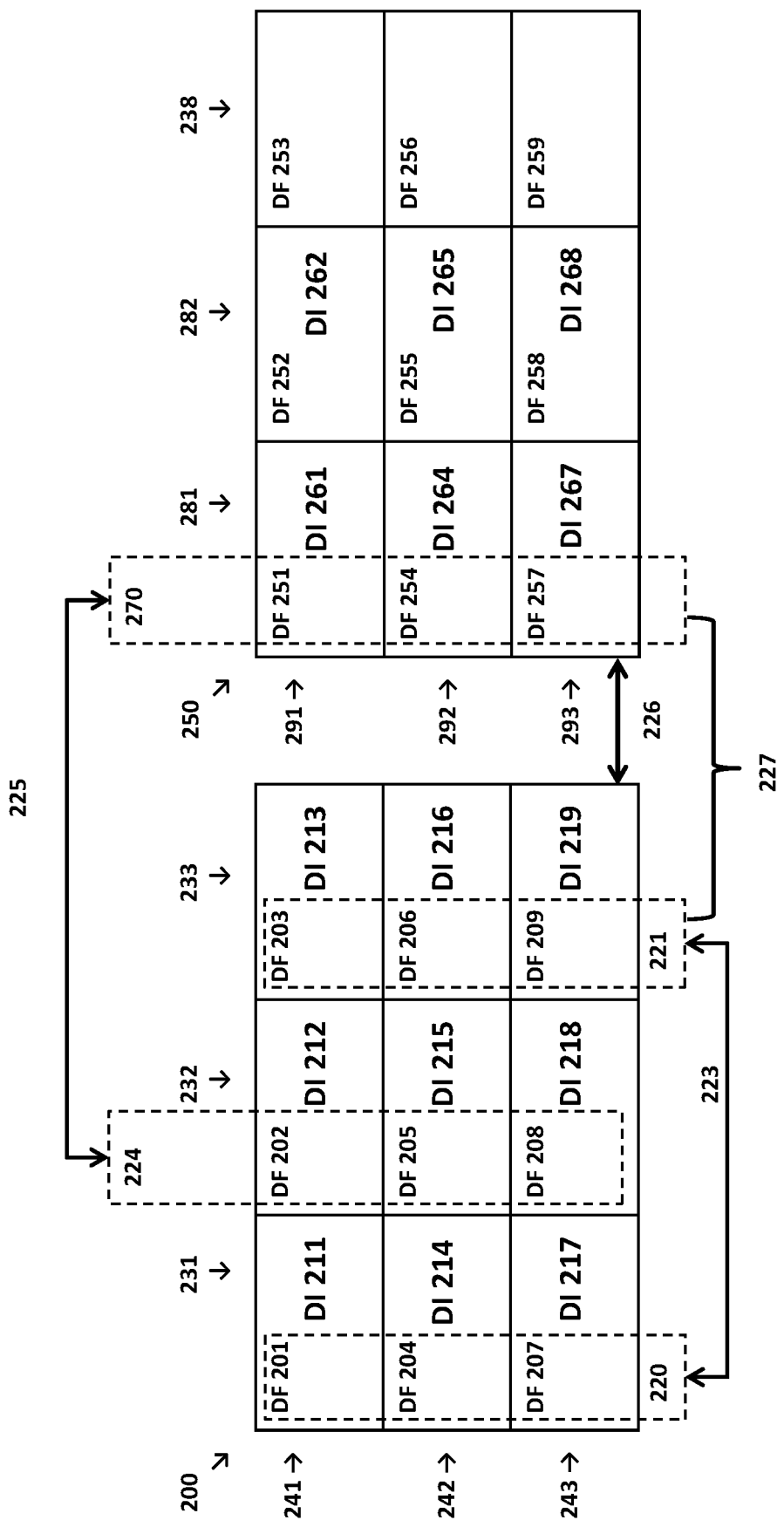
FIG. 2 shows a data structure.

The logical links are illustrated using an example depicted in FIG. 2. A pair of example electronic tables 200 and 250 is depicted in FIG. 2. The electronic table 200 has three rows 241, 242, 243 and three columns 231, 232, 233. The row 241 has three data fields: data field 201 storing data item 211, data field 202 storing data item 212, data field 203 storing data item 213. The row 242 has three data fields: data field 204 storing data item 214, data field 205 storing data item 215, data field 206 storing data item 216. The row 243 has three data fields: data field 207 storing data item 217, data field 208 storing data item 218, data field 209 storing data item 219. The column 231 has the data fields 201, 204, 207. The column 232 has the data fields 202, 205, 208. The column 233 has the data fields 203, 206, 209. The electronic table 250 has three rows 291, 292, 293 and three columns 281, 282, 283. The row 291 has three data fields: data field 251 storing data item 261, data field 252 storing data item 262, data field 253 storing no data items. The row 292 has three data fields: data field 254 storing data item 264, data field 255 storing data item 255, data field 256 storing no data items. The row 293 has three data fields: data field 257 storing data item 267, data field 258 storing data item 268, data field 259 storing no data items. The column 281 has the data fields 251, 254, 257. The column 252 has the data fields 262, 255, 258. The column 238 has the data fields 253, 256, 259. The electronic table 200 is liked by parent-child relationship 226 with the electronic table 250, wherein the electronic table 200 is a parent electronic table in the parent-child relationship. The data fields of the column 231 are linked by a primary key relationship 223 with the data fields of the column 233, wherein the data field 201 is linked by the primary key relationship with the data field 203, the data field 204 is linked by the primary key relationship with the data field 206, the data field 207 is linked by the primary key relationship with the data field 209. The data fields of the column 224 are linked by a foreign key relationship 225 with the data fields of the column 270, wherein the data field 202 is linked by the foreign key relationship with the data field 251, the data field 205 is linked by the foreign key relationship with the data field 254, the data field 208 is linked by the foreign key relationship with the data field 257.

For any of the first link specifications and any of the second link specifications matching each other at least one of the following criteria is complied with:

h) the first link specification specifies a foreign key relationship between a first pair of the first data fields and the second link specification specifies a foreign key relationship between a second pair of the second data fields, wherein a column comprising one of the first data fields of the first pair and a column comprising one of the second data fields of the second pair have matching specifications, wherein a column comprising another one of the first data fields of the first pair and a column comprising another one of the second data fields of the second pair have matching specifications, wherein the columns comprising the first pair are comprised in the different first electronic tables and the columns comprising the second pair are comprised in the different second electronic tables;

i) the first link specification specifies a primary key relationship between a third pair of the first data fields and the second link specification specifies a primary key relationship between a fourth pair of the second data fields, wherein a row comprising the third pair and a row comprising the fourth pair have matching specifications, wherein the row comprising the third pair is comprised in one of the first electronic tables and the row comprising the fourth pair is comprised in one of the second electronic tables;

j) the first link specification specifies that one of the first data fields is assigned to one of the first data domains and the second link specification specifies that that one of the second data fields is assigned to one of the second data domains, wherein the one of the first data domains and the one of the second data domains have matching specifications;

k) the first link specification specifies a parent-child relationship between a pair of the first electronic tables and the second link specification specifies a parent-child relationship between a pair of the second electronic tables, wherein the first electronic table of the pair being a parent in the parent-child relationship and the second electronic table of the pair being a parent in the parent-child relationship have matching specifications and the first electronic table of the pair being a child in the parent-child relationship and the second electronic table of the pair being a child in the parent-child relationship have matching specifications;

l) one of the first electronic tables specified in the first link specification and one of the second electronic tables specified in the second link specification have matching specifications;

m) a row of one of the first electronic table specified in the first link specification and a row of one of the second electronic tables specified in the second link specification have matching specifications;

n) a column of one of the first electronic table specified in the first link specification and a column of one of the second electronic tables specified in the second link specification have matching specifications.

Figure 3:
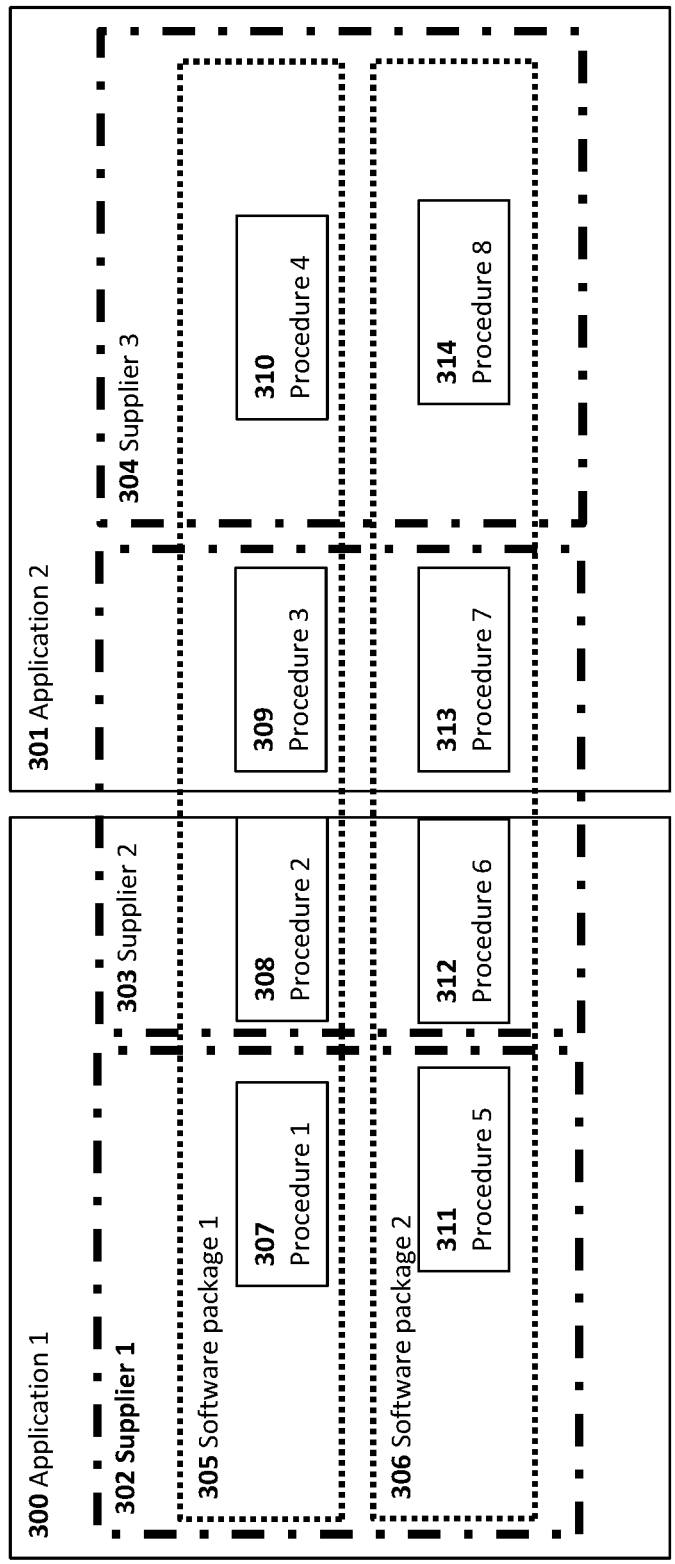
FIG. 3 shows a plurality of procedures of different applications, wherein the procedures originate from different suppliers and belong to different software packages.

A plurality of first computer applications is executable using the first database 103. The first applications can be installed on the first computer system 100 and/or one or more client computers communicatively coupled to the first computer system. A plurality of second computer applications is executable using the second database 123. The second applications can be installed on the second computer system 120 and/or on one or more client computers. The first and the second computer applications can be related to different applications areas. For instance some of the first and second applications can be related to an application area "Finances", some of the first and the second applications can be related to an application area "Logistics", some of the first and the second applications can be related to an application area "Manufacturing", etc. The first procedures are assigned to first computer applications and the second procedures are assigned to the second computer applications. As option each of the first procedures can be assigned to only one respective first computer applications and/or each of the second procedures can be assigned to only one respective second computer application. The first data fields can be assigned to the first computer applications and the second data fields can be assigned to the second computer applications as well. FIG. 3 illustrates an example applicable for both the first and the second procedures. A first procedure 307, a second procedure 308, a fifth procedure 311, and a sixth procedure 312 are assigned to a first application 300. A third procedure 309, a fourth procedure 310, a seventh procedure 313, and an eighth procedure 314 are assigned to a second application 301. Both the first and the second procedures can be developed by (originate from) different suppliers. Assignment of the first and the second procedures to the respective suppliers can be used as a differentiating feature of the first and the second procedures as well. For instance, the first procedure 307 and the fifth procedure 311 are assigned to a first supplier 302; the second procedure 309, the third procedure 309, the sixth procedure 312, and the seventh procedure 313 are assigned to a second supplier 303; the fourth procedure 312 and the eighth procedure 314 are assigned to a third supplier 304. The first and the second procedures can be assigned to software packages. As option each of some of the first and the second procedures is assigned to a respective software package. Assignment of the first and the second procedures to the software packages can be used as a differentiating feature of the first and the second procedures as well. For instance, the first procedure 307, the second procedure 308, the third procedure 309, and the fourth procedure 310 are assigned to a first software package 305; the fifth procedure 311, the sixth procedure 312, the seventh procedure 313, the eighth procedure 314 are assigned to a second software package 306. The second procedure specifications comprise second source codes of the second procedures and second descriptions of the second procedures.

For any of the first (second) data fields and any of the first (second) procedure specifications having a semantic link at least one of the following criteria is compiled with:

o) the first (second) data field is used in the first (second) source code comprised in the first (second) procedure specification;

p) the first (second) data field is used in the first (second) description comprised in the first procedure specification; and q) the first (second) data field and the first (second) procedure having the first (second) procedure specification are assigned to the same first (second) computer application.

Any of the first data fields having a semantic link to any arbitrary set of first procedure specifications can have a respective semantic link to each of the first procedure specifications of the any arbitrary set. Any of the first data fields having a semantic link to any arbitrary set of first procedure specifications can have a respective semantic link to each of the first procedure specifications of the any arbitrary set.

For any of the first procedure specifications and any of the second procedure specifications matching each other at least one of the following criteria can be fulfilled:

r) the first database function which execution is specified by the first source code comprised in the first procedure specification and the second database function which execution is specified by the second source code comprised in the second procedure specification have matching specifications;

s) the first database function described in the first description comprised in the first procedure specification and the second database function described in the second description comprised in the second procedure specification have matching specifications; and t) the first computer application to which the first procedure having the first procedure specification is assigned and the second computer application to which the second procedure having the second procedure specification is assigned have matching specifications.

The elements of or related to different databases have matching specifications when at least one of the following criteria is complied with:

u) the elements have the same names;

v) the elements have names which have synonymic meaning; and w) each of the descriptions of the elements comprises a respective set of keywords, wherein a predefined number of keywords is comprised in each of the sets of keywords and/or another predefined number of other keywords is comprised in one of the sets of keywords, wherein each of the other keywords comprised in the one of the sets of keywords has a respective synonym keyword in any of the other sets of keywords, x) each of the descriptions of the elements refers to the same functionalities, wherein the descriptions of the elements can be comprised in respective manuals of the databases, and/or descriptions of the procedures, and/or source codes of the procedures, wherein the elements are any one of the following sets: a set of columns each comprised in a different database, a set of rows each comprised in a different database, a set of data domains each comprised in a different database, a set of electronic tables each comprised in a different database, a set of database functions each used in a different database, or a set of computer applications each configured to use a different database. The criteria for matching specifications u)-x) are applicable for the criteria formulations h)-n) and r)-t).

Figure 4:
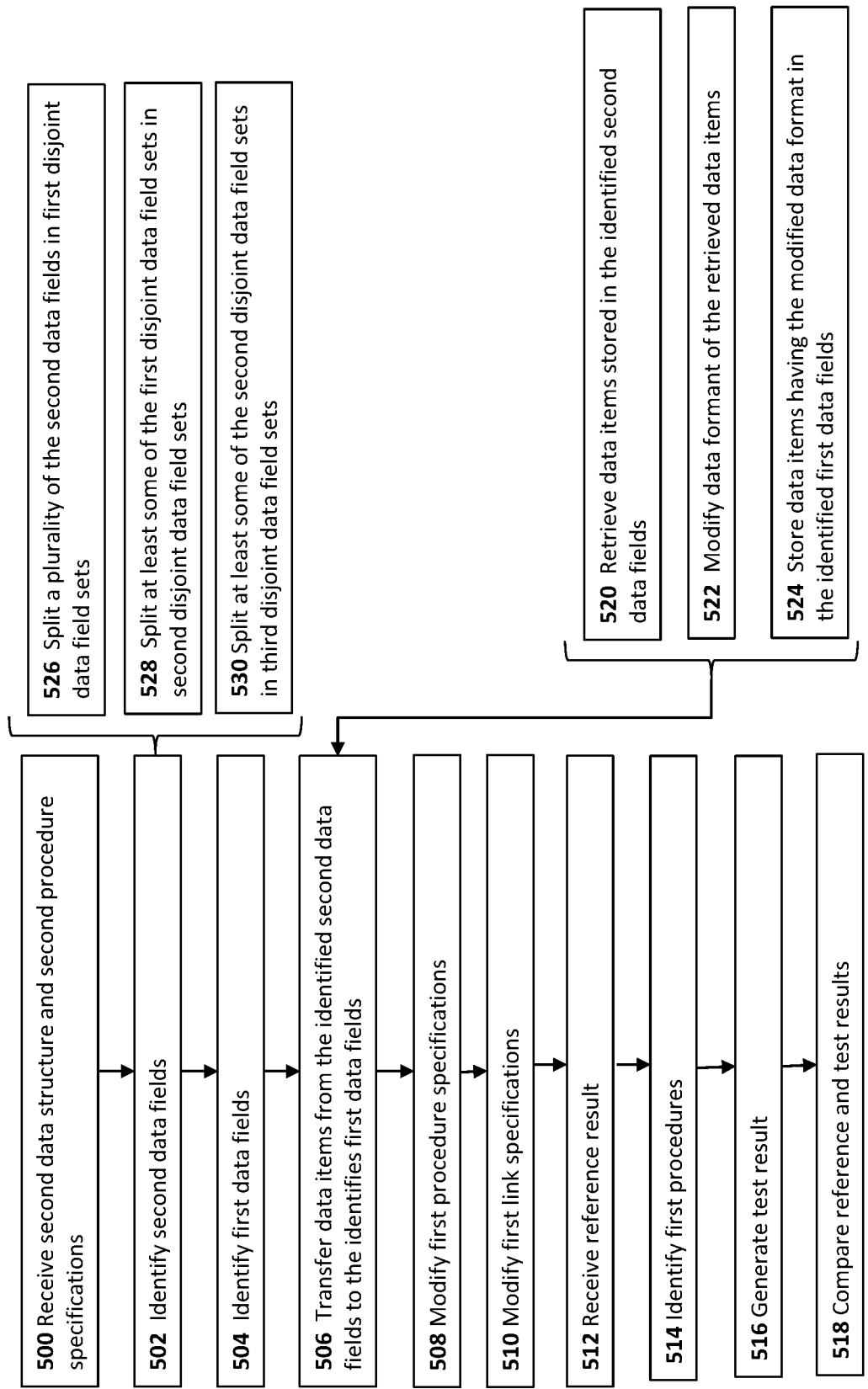
FIG. 4 shows a flowchart of an example method.

FIG. 4 illustrates and example computer-implemented method for data structure transfer to the first computer system. The method begins with process block 500, wherein second data structure of the second database and the second procedure specifications are received by the first computer system. The second data structure comprises a plurality of the second data fields storing data items. Process block 502 is executed after process block 500. In process block 502 second data fields each having the same second logical link and being semantically linked to a same third set of the second procedure specifications. The third set of the second procedure specifications and said second logical link can be predefined or preselected ones.

Process blocks 526 and 528 can be an alternative implementation of process block 502. Process block 526 can comprise the following steps: splitting a plurality of at least some of the second procedure specifications in disjoint specification sets, wherein one of the disjoint specification sets constitutes said third set used for the identification of the second data fields in process block 502 and other disjoint specification sets constitute other third sets; identifying, for each of the third sets, a data field set of the second data fields each being semantically linked to the each of the third sets. Process block 528 is executed after process block 526. The process block 528 can comprise the following step: splitting each of the data field sets in disjoint data field sets, wherein any second data field of each of the disjoint data field sets has the same respective second logical link assigned to the each of the disjoint data field sets, wherein the identifying of the second data fields in process block 502 is comprised in the splitting of the each of the data field sets in the disjoint data field sets, wherein one of the disjoint data field sets constitutes the identified second data fields identified in process block 502. The second logical links assigned to the disjoint data field sets can be identified by evaluating the second logical links of the second data fields of the data field sets.

The execution of the process blocks 526 and 528 is illustrated in FIG. 5. A plurality 400 of the data fields storing data items to be transferred is a plurality of the second data fields storing data items to be transferred which is received in process block 500. The plurality of the second data fields 400 is split in the first set 400 and the second set 401 both being the data field sets identified in process block 526, wherein the first link of each of the second data fields of the first set 401 is the semantic link to one of the third sets, wherein the second link which of each of the second data fields of the second set 402 is the semantic link to another one of the third sets. The first set 401 is split in the first subset 403 and the second subset 404 both being the disjoint data field sets. The second set 402 is split in the first subset 405 and the second subset 406 both being the disjoint data field sets. The third link of each of second fields of the first subset 403 is the respective second logical link assigned to the first subset 403. The fourth link of each of second fields of the second subset 404 is the respective second logical link assigned to the second subset 404. The fifth link of each of second fields of the first subset 405 is the respective second logical link assigned to the first subset 405. The sixth link of each of second fields of the second subset 406 is the respective second logical link assigned to the second subset 406.

Process blocks 526 and 528 can have an alternative implementation. In this implementation process block 526 comprises the following step: identifying, for each of some of the second logical links, a data field set of the second data fields each having the each of some of the second logical links, wherein the data field sets are disjoint sets, wherein each of the second data fields identified in process block 502 has one of the some of the second logical links; and process block 528 comprises the following steps: identify for each of the data field sets a respective plurality of the second procedure specifications each being semantically linked to at least one of the second data fields of the each of the data field sets, split each of the pluralities of the second procedure specifications in disjoint specification sets of the second procedure specifications, wherein one of the disjoint specification sets constitutes said third set and other disjoint specification sets constitute other third sets; and split each of the data field sets in disjoint data field sets, wherein any second data field of each of the disjoint data field sets is semantically linked to the respective third set, wherein the identifying of the second data fields in process block 502 is comprised in the splitting of the each of the data field sets in the disjoint data field sets, wherein one of the disjoint data field sets constitutes the identified second data fields.

The execution of the alternative implementation of process blocks 526 and 528 can be illustrated using FIG. 5 as well. A plurality 400 of the data fields storing data items to be transferred is a plurality of the second data fields storing data items to be transferred which is received in process block 500. The plurality of the second data fields 400 is split in the first set 400 and the second set 401 both being the data field sets identified in process block 526, wherein the first link of each of the second data fields of the first set 401 is the one of the some of the second logical links, wherein the second link which of each of the second data fields of the second set 402 is another one of some of the second logical links. The first set 401 is split in the first subset 403 and the second subset 404 both being the disjoint data field sets. The second set 402 is split in the first subset 405 and the second subset 406 both being the disjoint data field sets. The third link of each of second fields of the first subset 403 is the semantic link to the respective third set. The fourth link of each of second fields of the second subset 404 is the semantic link to the respective third set. The fifth link of each of second fields of the first subset 405 is the semantic link to the respective third set. The sixth link of each of second fields of the second subset 406 is the semantic link to the respective third set.

The implementation of the process block 502 can comprise in addition to the process blocks 526 and 526 further process blocks (e.g. process block 530) wherein the disjoint data field sets are split in further disjoint data field sets. This can be implemented by assigning to each of the process blocks a respective set of the second logical links or a respective plurality of sets of the second procedure specifications. In this case in each of the process blocks at least one set of the second data fields is split in disjoint sets of the second data fields, wherein each of the disjoint sets has an assigned respective second logical link of the set of the second logical links assigned to the each of the of the process blocks or an assigned semantic link to the respective set of the second procedure specifications of the plurality of the sets of the second procedure specifications assigned to the each of the process blocks, wherein each second data field of any of the disjoint sets has respectively the second logical link assigned to the any of the disjoint sets or the semantic link to the set of the second procedure specifications assigned to the any of the disjoint sets. These process blocks are executed sequentially, wherein at least one set of the second data fields generated in one of the process blocks is split in disjoint sets in the process block executed immediately after the one of the process blocks. The execution of the sequence of the process blocks can be ended when all process blocks are executed or when the sets generated in the last executed process block comply with set compliance criterion. The set compliance criterion can be for instance a requirement that any of the sets comprises less than a predefined number of the second data fields. Thus when all sets generated in the last executed process block comply with the set compliance criterion further process blocks are not executed.

The assignment of the sets of the second logical links and the pluralities of the sets of the second procedure specifications to the respective process blocks can be performed in accordance with the following considerations. The optimum size of and/or logical structure of the generated sets can be provided, when execution of each process block results in a minimum possible number of sets. This can be implemented using the following steps for each of the process blocks in the sequence of the process blocks, wherein the assignment of the sets of the second data fields or the pluralities of sets of the procedure specification to the process blocks is performed sequentially starting with the process block being the first in the sequence. First a number of sets of the second data fields which can be generated in the process block is evaluated for each of the sets of the second logical links and each of the pluralities of the sets of the second procedure specifications, which can be used in the process block for generating sets of the second data fields and are not assigned to the other, if any, process blocks. Afterwards the set of the second logical inks or the plurality of the sets of the second procedure specifications which utilization for the generation of the sets of the second data fields results in the least number of the sets of the second data fields is assigned to the process block. Reduction of a number of sets generated in process blocks having assigned the respective pluralities of sets of second procedure specifications can be achieved by grouping of the second procedure specifications in the sets such that amounts of the second procedure specifications in the sets are minimized. In the ultimate case each of some of the sets of the second procedure specifications comprises only one respective second procedure specification or each of the sets of the second procedure specifications comprises only one respective second procedure specification.

Evaluation of the second logical links and the semantic links can be performed by evaluating the second logical and/or semantic links of each of the second data fields in the second data structure. For instance a link list comprising at least one of the second logical links and/or at least one of the semantic links can be generated for each of the second data fields. An example of the link lists is depicted in FIG. 6 in a tabular form. The link lists for data fields 213 and 202 depicted in FIG. 2 are presented in the table depicted in FIG. 6. The second specifications of the second logical links are summarized in the sections "Table", "Domain", "Foreign key relationship," and "Primary key relationship". The sets of the procedure specifications are summarized in the section "Procedure". The data field 213 has the following specifications of its logical link: link specification "Table" specifies that the data field 213 is allocated in row 241 and column 233 of the table 200 having the parent-child relationship with the table 250; link specification "Data domain" specifies that the data field 213 is assigned to the data domain 227; link specification "Primary key relationship" specifies that the data field 213 is linked by the primary key relationship to the data field 201 allocated in the row 241 and column 231 of the table 200. The data field 202 has the following specifications of its logical link: link specification "Table" specifies that the data field 202 is allocated in row 241 and column 232 of the table 200 having the parent-child relationship with the table 250; link specification "Foreign key relationship" specifies that the data field 202 is linked by the primary key relationship to the data field 251 allocated in the row 291 and column 281 of the table 250. The data field 213 has a semantic link to a set of procedure specifications, wherein the set comprises a specification of the first procedure, a specification of the first application using the first procedure, a specification of the first supplier of the first procedure, and a specification of the first software package comprising the first procedure. The data field 202 has a semantic link to the same set of the procedure specifications. The evaluation of the second logical links and the semantic links of the second data fields enables straight forward calculation of the second data fields having a particular second logical link and/or a semantic link to a particular second procedure specification. Knowing the numbers of the second data fields having respective second logical links and/or semantic links to respective second procedure specifications enables generation of the aforementioned sequence of the process blocks providing generation of sets of second data fields having optimum size and/or logical structure.

Process block 502 or any of its alternative implementations can be executed by the second trained ML module 108 for identifying data fields in a database each having a same logical link and a semantic link to a same set of procedure specifications. The second ML module 108 can be trained using data structures and procedure specifications of databases as input data and sets of data fields each having a same logical ink and a semantic link to a same set of procedure specifications as expected result data. At least one set of the second data fields each having the same second logical link and being semantically linked to the same third set of the second procedure specifications can be generated by the second ML module using the second procedure specifications and the second sets of the second link specifications.

Process block 504 is executed after process block 502. In process block 504 first data fields are identified in the first database, wherein each of the identified first data fields has the same first logical link and being semantically linked to a same fourth set of the first procedure specifications. Each of some of the second procedure specifications of the third set of the second procedure specifications matches the respective first procedure specification of the fourth set of the first procedure specifications. Each of some of the first link specifications of the first set of the first link specifications of the first logical link of the identified first data fields matches a respective second link specification of the second set of the second link specifications of the second logical link of the identified second data fields. The identified second data fields are data fields identified in the process block 502 each having the same second logical link and being semantically linked to the same said third set of the second procedure specifications.

Process block 504 can be executed using the first trained ML, module 107 for identifying data fields in a data structure of one database having procedure specifications using one or more logical links of another database and one or more procedure specifications of the other database. The first ML module can be trained using a data structure and procedure specifications of one database, a logical link in a data structure of another database, and a set of procedure specifications of the other database as input data and a set of data fields in the data structure of the database as expected result data, wherein each data field in the set of the data fields of the expected result data has the same logical link in the data structure of the database and a semantic link to a same set of the procedure specifications of the database, wherein each of some of the procedure specifications of the set of the procedure specifications in the input data matches a respective procedure specification in the set of the procedure specifications being semantically linked to the set of data fields in the expected result data, wherein each of some of the link specifications of the logical link in the input data matches a respective link specification of the logical link of the set of data fields of the expected result data. Identification of the first data fields identified in process block 504 can be executed by the first trained ML module using the third set and the second logical link which the identified second data fields have, wherein the identified second data fields are the second data fields identified in process block 502.

Process block 506 is executed after process block 504. In process block 506, data items stored in the second data fields identified in process block 502 are transferred to the first data fields identified in process block 504. One to one correspondence of identified first data fields to the identified second data fields can be established their respective first and second logical links. Process block 506 can comprise process blocks 520, 522, and 524. Process blocks 520, 522, and 524 are executed when the second data fields identified in process block 502 and the first data fields identified in process block 504 have different data formats for storing data items.

In process block 520 one or more of the data items stored in the identified second data fields are retrieved. Process block 522 is executed after process block 520. In process block 522 an auxiliary procedure for modifying a data format of the retrieved one or more data items is executed, wherein the auxiliary procedure is identified in the procedure pool by comparing a data format used in the identified second data fields for storing the one or more data items with a data format used in the identified first data fields for storing the one or more data items. The identification of the auxiliary procedure can be executed by the fifth trained ML module 111 for identifying auxiliary procedures for modifying data format of data items by using source and target data formats as input for format comparison. The fifth ML module can be trained by using a source and a target data format as an input data and a specification of an auxiliary procedure for converting data items having the source data format into data items having the target data format as expected result data. The auxiliary procedure identified in process block 522 is identified by the fifth trained ML module using the data format used in the identified second data fields for storing the one or more data items and the data format used in the identified first data fields for storing the one or more data items as input for format comparison. Process block 524 is executed after process block 522. In process block 524 the one or more data items having the modified data format are stored in the identified first data fields.

Process block 508 is executed after process block 506. Process block 508 is an optional one. It is not executed when each of the second procedure specifications of the third set used in the process block 502 matches the respective first procedure specification of the fourth set used in the process block 504. In process block 508 one or more auxiliary procedures for modifying first procedure specifications are executed, wherein the one or more auxiliary procedures are identified in the procedure pool using one or more of the second procedure specifications comprised in the third set used in process block 502 and having no matching first procedure specifications in the fourth set used in process block 504 and one or more of the first procedure specifications comprised in the fourth set used in process block 504 and having no matching second procedure specifications in the third set used in process block 502. The one or more of the first procedure specifications comprised in the fourth set used in process block 504 and having no matching second procedure specifications in the third set used in process block 502 are modified by the execution of the identified one or more auxiliary procedures. The result of the execution of the identified one or more auxiliary procedures is that each of the second procedure specifications of the third set used in the process block 502 matches the respective first procedure specification of the fourth set used in the process block 504. The modification of the first procedure specification can comprise for instance modification of the source code of respective first procedure such that its first procedure specification matches the respective second procedure specification, e.g. the modified source code of the first procedure and the source code of the second procedure have the same functionalities. Identification of one or more auxiliary procedures can be executed by the third trained ML module 109 for identifying one or more auxiliary procedures for modifying first procedure specifications using one or more procedure specifications as original specifications and one or more procedure specifications as target specifications. The third ML module can be trained using one or more procedure specifications being original specifications and one or more procedure specifications being target specifications as input data and one or more specifications of auxiliary procedures for modifying first procedure specifications as expected result data. The one or more auxiliary procedures identified in process block 508 can be identified by the third trained ML module using one or more of the second procedure specifications comprised in the third set used process block 502 and having no matching first procedure specifications in the fourth set used in process block 504 as target specifications and one or more of the first procedure specifications comprised in the fourth set used in process block 504 and having no matching second procedure specifications in the third set used in process block 502 as source specifications.

Process block 510 is executed after process block 508. As alternative process block 510 is executed after process block 506 and before process block 508. Process block 510 is an optional one. It is not executed when each of the second link specifications of the second set of the second link specifications of the second logical link of the identified second data fields identified in process block 502 matches a respective first link specification of the first set of the first link specifications of the first logical link of the identified first data fields identified in process block 504. In process block 510 one or more auxiliary procedures for modifying first link specifications are executed, wherein the one or more auxiliary procedures are identified in the procedure pool using one or more of the second link specifications comprised in the second set of the second link specifications of the second logical link of the identified second data fields identified in process block 502 and having no matching first link specifications comprised in the first set of the first link specifications of the first logical link of the identified first data fields identified in process block 504 and one or more of the first link specifications comprised in the first set of the first link specifications of the first logical link of the identified first data fields identified in process block 502 and having no matching second link specifications comprised in the second set of the second link specifications of the second logical link of the identified second data fields identified in process block 504. The one or more of the first link specifications comprised in the first set of the first link specifications of the first logical link of the identified first data fields identified in process block 502 and having no matching second link specifications comprised in the second set of the second link specifications of the second logical link of the identified second data fields identified in process block 504 are modified by the execution of the identified one or more auxiliary procedures. The result of the execution of the identified one or more auxiliary procedures is that each of the second link specifications of the second set of the second link specifications of the second logical link of the identified second data fields identified in process block 502 matches a respective first link specification of the first set of the first link specifications of the first logical link of the identified first data fields identified in process block 504. The modification of the one or more of the first link specifications comprised in the first set of the first link specifications of the first logical link of the identified first data fields identified in process block 502 and having no matching second link specifications comprised in the second set of the second link specifications of the second logical link of the identified second data fields identified in process block 504 can comprise for instance modification of one or more respective specifications primary key relationships and/or one or more respective specifications of secondary key relationships and/or one or more respective specifications of parent-child relationships. The identification of one of more auxiliary procedures can be executed by the fourth trained ML module for identifying one or more auxiliary procedures for modifying first link specifications using one or more link specifications as original specifications and one or more link specifications as target specifications. The fourth ML module can be trained by using one or more link specifications being original specifications and one or more link specifications being target specifications as input data and one or more specifications of auxiliary procedures for modifying of first link specifications as expected result data. The one or more auxiliary procedures identified in process block 510 can be identified by the fourth trained ML using one or more of the second link specifications comprised in the second set of the second link specifications of the second logical link of the identified second data fields and having no matching first link specifications comprised in the first set of the first link specifications of the first logical link of the identified first data fields as target specifications and one or more of the first link specifications comprised in the first set of the first link specifications of the first logical link of the identified first data fields used in process block 504 and having no matching second link specifications comprised in the second set of the second link specifications of the second logical link of the identified second data fields used in process block 502 as source specifications.

In case when several sets of the second data fields are identified in process block 502 execution of process block 506 in conjunction with at least one of the process blocks 508 and 510 can be performed for each of the identified sets separately in an iterative way, wherein in each of the iterations data items stored in the second data fields of only one of the identified sets are transferred to the first database and afterwards the first data structure of the first database and/or the first procedures of the first database are debugged/modified by execution of process block 508 and/or process block 510. In this case a number of modifications to be executed in process block 508 and/or process block 510 is substantially less in comparison with a case when data items stored in the second data fields of all of the identified sets are transferred in one execution of process block 506 and afterwards the first data structure of the first database and/or the first procedures of the first database are debugged/modified by execution of process block 508 and/or process block 510. This iterative approach can have an advantage because the debugging/modification procedures may be performed with higher degree of reliability and/or efficiency. One the other hand the approach when the data items stored in all identified sets are transferred in one execution of process block 506 can have its own advantage as well, because it may enable parallel processing, wherein data items stored in the second data fields of the different identified sets may be transferred to the first database concurrently.

Optional process block 512 is executed after process block 506 if process blocks 508 and 510 are not executed and after execution of process block 508 and process block 510 when process block 508 and process block 510 are executed. In case when only one of the process blocks 508 and 510 is executed, then the optional process block 512 is executed after execution of the only one of the process blocks 508 and 510. In optional process block 512 reference result data is received by the first computer system 100. The reference result data can be received from the second computer system 120. The reference result data is generated on the second database by executing one or more of the second procedures using data items being identical to the data items transferred to the identified first data fields in process block 506. The reference result data can be generated by the second computer system. Process block 514 is executed after process block 512. In process block 514 the identification, for each of the one or more of the second procedures, of the first procedure having the first procedure specification which matches the second procedure specification of the each of the one or more of the second procedures is executed. Process block 516 is executed after process block 514. In process block 512 test result data is generated on the first database by executing the identified one or more of the first procedures using said data items transferred to the identified first data fields. The generation of the test result data can be performed by the first computer system 100. Process block 518 is executed after process block 516. In process block 518 the reference result data is compared with the test result data. In case when the comparison reveals that the reference result data and the test result data are different an error data charactering differences between the reference result data and the test result data is generated. The error data is used to identify one or more auxiliary procedures for modifying first procedure specifications and/or one or more auxiliary procedures for modifying first link specifications. Afterwards the identified one or more auxiliary procedures for modifying first procedure specifications and/or the identified one or more auxiliary procedures for modifying first link specifications are executed. The identification of the one or more auxiliary procedures for modifying first procedure specifications and/or the one or more auxiliary procedures for modifying first link specifications can be performed by a sixth trained ML 113 module for identification of auxiliary procedures for modifying first procedure specifications and auxiliary procedures for modifying first link specifications using the error data as input. The sixth ML module 113 can be trained by using error data as input data and one or more specifications of auxiliary procedures for modifying first procedure specifications and/or one or more specifications of auxiliary procedures for modifying first link specifications as expected result data. In case when error data is generated in process block 518, process blocks 512, 514, 516, and 518 can be repeated until no error data is generated in process block 518.

The term "computer system" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back end, middleware, or front end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any implementation or on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some causes be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

The preceding figures and accompanying description illustrate the example processes and computer implementable techniques. But example environment (or their software or other components) contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, the example environment may use processes with additional, fewer and/or different operations, as long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "control system" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto optical disks; and CD ROM, DVD+/–R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back end, middleware, or front end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any implementation or on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some causes be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

The invention claimed is:

1. A computer system, comprising at least one computer processor, a memory, and a first database, the first database comprising a first procedure specification of at least one first procedure, and a first data field configured to store a data item, the first data field comprising a first logical link within a first data structure of the first database, the first logical link comprising a respective first set of first link specifications, wherein the first procedure is configured to retrieve the data item stored in the first data field upon execution by the processor, the memory comprising computer executable code which when executed by the at least one computer processor causes the at least one computer processor to perform operations comprising:

receiving a second data structure of a second database and a second procedure specification of a second procedure, the second data structure comprising a second data field storing second data items, the second data field comprising a second logical link within the second data structure of the second database, the second logical link comprising a respective second set of second link specifications, wherein the second procedure is configured to retrieve the second data items stored in the second data field upon execution by the at least one computer processor configured to control the second database;

determining a second semantic link between the second procedure specification and the second data field, wherein the second data field shares the second logical link with an additional second data field, and wherein the second logical link corresponds to the second data field;

determining a first semantic link between the first procedure specification and the first data field, wherein the first procedure specification corresponds to the second procedure specification, wherein the first logical link corresponds to the first data field, and wherein a first link specification of the first logical link matches a respective second link specification of the second logical link;

identifying, via a first trained machine learning (ML) module, one or more of the first data field in a the first data structure of the first database comprising the first procedure specification using one or more logical links of the second database and the procedure specification of the second database, wherein the identifying the first data fields is executed by the at least one computer processor via the first trained ML module using the respective second set of second link specifications and the second logical link present in the second data field;

transferring a linked data item stored in the second data field to the first data field, wherein the first data field comprises the linked data item after the transferring, and wherein the linked data item transferred to the first data field comprises the first logical link and the second logical link with the additional second data field;

modifying a data format of the retrieved one or more data items, by comparing a data format used in the identified second data fields for storing the one or more data items with a data format used in the identified first data fields for storing the one or more data items; and storing, via the at least one computer processor, the one or more data items having the modified data format in the identified first data fields.

2. The computer system of claim 1, further comprising:

a second trained ML module configured to identify the second data fields in a data structure of one database comprising procedure specifications using one or more logical links of another database and one or more procedure specifications of the other database, wherein the identifying the first data fields is executed by the second trained ML module using a third set and the second logical link present in the second data field.

3. The computer system of claim 2, further comprising:

a procedure pool of auxiliary procedures for data and functionality transfer to the first database, wherein the operation further comprise:

executing one or more auxiliary procedures for modifying first procedure specifications, wherein the one or more auxiliary procedures are identified in the procedure pool using one or more of the second procedure specifications comprised in the third set of procedure specifications comprising no matching first procedure specifications in a fourth set of first procedure specifications, and one or more of the first procedure specifications comprised in the fourth set of first procedure specifications and comprising no matching second procedure specifications in the third set of second procedure specifications; and executing one or more other auxiliary procedures for modifying the first set of first link specifications, wherein the one or more other auxiliary procedures are identified in the procedure pool using one or more of the second link specifications comprised in the second set of the second link specifications of the second logical link of identified second data fields and comprising no matching first link specifications comprised in the first set of first link specifications of the first logical link of the identified first data fields and one or more of the first set of first link specifications comprised in the first set of the first link specifications of the first logical link of the identified first data fields and comprising no matching second link specifications comprised in the second set of the second link specifications of the second logical link of the identified second data fields.

4. The computer system of claim 3, further comprising:
a third trained ML module configured identify one or more auxiliary procedures for modifying first procedure specifications using one or more procedure specifications as original specifications and one or more procedure specifications as target specifications, wherein the one or more auxiliary procedures are identified by the third trained ML module using one or more of the second procedure specifications comprised in the third set and comprising no matching first procedure specifications in the fourth set as target specifications and one or more of the first procedure specifications comprised in the fourth set and comprising no matching second procedure specifications in the third set as source specifications; and a fourth trained ML module configured to identify one or more auxiliary procedures for modifying first link specifications using one or more link specifications as original specifications and one or more link specifications as target specifications, wherein the one or more other auxiliary procedures are identified by the fourth trained ML module using one or more of the second link specifications comprised in the second set of the second link specifications of the second logical link of the identified second data fields and comprising no matching first link specifications comprised in the first set of the first link specifications of the first logical link of the identified first data fields as target specifications and one or more of the first link specifications comprised in the first set of the first link specifications of the first logical link of the identified first data fields and comprising no matching second link specifications comprised in the second set of the second link specifications of the second logical link of the identified second data fields as source specifications.

5. The computer system of claim 4, further comprising:
a procedure pool of auxiliary procedures for data and functionality transfer to the first database, wherein the transferring of the data items stored in the identified second data fields to the identified first data fields comprises:
retrieving one or more of the data items stored in the identified second data fields; and
executing an auxiliary procedure for modifying the data format of the retrieved one or more data items, wherein the auxiliary procedure is identified in the procedure pool by comparing a data format used in the identified second data fields for storing the one or more data items with a data format used in the identified first data fields for storing the one or more data items.

6. The computer system of claim 5, further comprising:
a fifth trained ML module configured to identify auxiliary procedures for modifying data format of data items by using source and target data formats as input for format comparison, wherein the auxiliary procedure is identified by the fifth trained ML module using the data format used in the identified second data fields for storing the one or more data items and the data format used in the identified first data fields for storing the one or more data items as input for format comparison.

7. The computer system of claim 1, wherein the first data structure comprises first electronic tables comprising the first data field, wherein at least one of the first electronic tables are linked by parent-child relationships with each other, wherein multiple first data fields are linked by primary key relationships, wherein multiple first data fields are linked by foreign key relationships, wherein multiple first data fields are assigned to a respective first data domain within the first data structure, wherein multiple first data domains comprise the assigned first data fields which are comprised in different first electronic tables, wherein each of the first sets of first link specifications comprise at least one of the following first link specifications of the first logical link of the respective first data field:

a foreign key relationship between the respective first data field and another first data field;

a primary key relationship between the respective first data field and another first data field;

a domain specification of a first data domain to which the respective first data field is assigned;

a parent-child relationship specification of a parent-child relationship between one of the first electronic tables being a child in the parent-child relationship and another one of the first electronic tables comprising the respective first data field;

a table specification of the first electronic table comprising the respective first data field;

a row specification of a row of the first electronic table, wherein the row of the first electronic table comprises the respective first data field; or a column specification of a column of the first electronic table, wherein the column of the first electronic table comprises the respective first data field.

8. The computer system claim 1, wherein the second data structure comprises second electronic tables comprising the second data fields, wherein some of the second electronic tables are linked by parent-child relationships with each other, wherein multiple second data fields are linked by primary key relationships, wherein multiple second data fields are linked by foreign key relationships, wherein multiple second data fields are assigned to a respective second data domain within the second data structure, wherein each of at least one of the second data domains comprising the assigned second data fields which are comprised in different second electronic tables, wherein each of the second sets of second link specifications comprises at least one of the following second link specifications of the second logical link of the respective second data field:

a foreign key relationship between the respective second data field and another one of the second data fields;

a primary key relationship between the respective second data field and another one of the second data fields;

a domain specification of a second data domain to which the respective second data field is assigned;

a parent-child relationship specification of a parent-child relationship between one of the second electronic tables being a child in the parent-child relationship and another one of the second electronic tables comprising the respective second data field;

a table specification of the second electronic table comprising the respective second data field;

a row specification of a row of the second electronic table, wherein the row of the second electronic table comprises the respective second data field; or a column specification of a column of the first electronic table, wherein the column of the first electronic table comprises the respective first data field.

9. The computer system of claim 7, wherein for any of the first link specifications and any of the second link specifications matching each other, at least one of the following criteria is met:

the first link specification specifies a foreign key relationship between a first pair of the first data fields and the second link specification specifies a foreign key relationship between a second pair of the second data fields, wherein a column comprising one of the first data fields of the first pair and a column comprising one of the second data fields of the second pair have matching specifications, wherein a column comprising another one of the first data fields of the first pair and a column comprising another one of the second data fields of the second pair have matching specifications, wherein the columns comprising the first pair are comprised in the different first electronic tables and the columns comprising the second pair are comprised in the different second electronic tables;

the first link specification specifies a primary key relationship between a third pair of the first data fields and the second link specification specifies a primary key relationship between a fourth pair of the second data fields, wherein a row comprising the third pair and a row comprising the fourth pair have matching specifications, wherein the row comprising the third pair is comprised in one of the first electronic tables and the row comprising the fourth pair is comprised in one of the second electronic tables;

the first link specification specifies that one of the first data fields is assigned to one of the first data domains and the second link specification specifies that that one of the second data fields is assigned to one of the second data domains, wherein the one of the first data domains and the one of the second data domains have matching specifications;

the first link specification specifies a parent-child relationship between a pair of the first electronic tables and the second link specification specifies a parent-child relationship between a pair of the second electronic tables, wherein the first electronic table of the pair being a parent in the parent-child relationship and the second electronic table of the pair being a parent in the parent-child relationship have matching specifications and the first electronic table of the pair being a child in the parent-child relationship and the second electronic table of the pair being a child in the parent-child relationship have matching specifications;

one of the first electronic tables specified in the first link specification and one of the second electronic tables specified in the second link specification have matching specifications;

a row of one of the first electronic table specified in the first link specification and a row of one of the second electronic tables specified in the second link specification have matching specifications; or a column of one of the first electronic table specified in the first link specification and a column of one of the second electronic tables specified in the second link specification have matching specifications.

10. The computer system of claim 1, wherein the first data field is assigned to a first computer application executable using the first database, wherein the first procedure is assigned to the first computer application, wherein the first procedure specification comprises first source codes of the first procedure and a first description of the first procedure, wherein any first data field comprising a semantic link to any arbitrary set of first procedure specifications comprises a respective semantic link to each of the first procedure specifications of the any arbitrary set, wherein for any of the first data fields and any of the first procedure specifications comprising the semantic link, at least one of the following criteria is met:

the first data field is used in the first source code comprised in the first procedure specification;

the first data field is used in the first description comprised in the first procedure specification; or the first data field and the first procedure comprising the first procedure specification are assigned to the same first computer application.

11. The computer system of claim 1, wherein the second data field is assigned to a second computer application executable using the first database, wherein the second procedure is assigned to the second computer application, wherein the second procedure specification comprises second source codes of the second procedure and a second description of the second procedure, wherein any second data field comprising a semantic link to any arbitrary set of second procedure specifications comprises a respective semantic link to each of the second procedure specifications of the any arbitrary set, wherein for any of the second data fields and any of the second procedure specifications comprising the semantic link, at least one of the following criteria is met:

the second data field is used in the second source code comprised in the second procedure specification;

the second data field is used in the second description comprised in the second procedure specification; or the second data field and the second procedure comprising the second procedure specification are assigned to the same second computer application.

12. The computer system of claim 10, wherein the first source codes specify execution of first database functions of the first database using the first data field and/or data items stored in the first data field, wherein the first description describes the first database functions, wherein the second source codes specify execution of second database functions of the second database using the second data field and/or data items stored in the second data fields, wherein the second description describes the second database functions, wherein for any of the first procedure specifications and any of the second procedure specifications matching each other at least one of the following criteria is fulfilled:

the first database function which execution is specified by the first source code comprised in the first procedure specification and the second database function which execution is specified by the second source code comprised in the second procedure specification have matching specifications;

the first database function described in the first description comprised in the first procedure specification and the second database function described in the second description comprised in the second procedure specification have matching specifications; and the first computer application to which the first procedure comprising the first procedure specification is assigned and the second computer application to which the second procedure comprising the second procedure specification is assigned have matching specifications.

13. The computer system of claim 1, wherein the operations further comprise:

splitting a second procedure specification in disjoint specification sets, wherein one of the disjoint specification sets constitutes a third set and other disjoint specification sets constitute other third sets;

identifying, for each of the third sets, a data field set of the second data fields each being semantically linked to the each of the third sets; and splitting each of the data field sets in disjoint data field sets, wherein any second data field of each of the disjoint data field sets comprises the same respective second logical link assigned to the each of the disjoint data field sets, wherein the identifying of the second data fields is comprised in the splitting of the each of the data field sets in the disjoint data field sets, wherein one of the disjoint data field sets constitutes the identified second data fields.

14. A computer-implemented method for data structure transfer to a computer system comprising a first database, the first database comprising first procedure specifications of first procedures and a first data field for storing data items, the first data field comprising first logical links within a first data structure of the first database, each of the first logical links comprising a respective first set of first link specifications, wherein the first procedures are computer executable procedures using the data items stored in the first data fields the computer-implemented method comprising:

receiving, by at least one computer processor, a second data structure of a second database and a second procedure specification of a second procedure, the second data structure comprising a second data field storing second data items, the second data field comprising a second logical link within the second data structure of the second database, the second logical link comprising a respective second set of second link specifications, wherein the second procedure is configured to retrieve the second data items stored in the second data field upon execution by the at least one computer processor configured to control the second database;

determining, by the at least one computer processor, a second semantic link between the second procedure specification and the second data field, wherein the second data field shares the second logical link with an additional second data field, and wherein the second logical link corresponds to the second data field;

determining, by the at least one computer processor, a first semantic link between the first procedure specification and the first data field, wherein the first procedure specification corresponds to the second procedure specification, wherein the first logical link corresponds to the first data field, and wherein a first link specification of the first logical link matches a respective second link specification of the second logical link;

identifying, by the at least one computer processor via a first trained machine learning (ML) module, one or more of the first data field in a the first data structure of the first database comprising the first procedure specification using one or more logical links of the second database and the procedure specification of the second database, wherein the identifying the first data fields is executed by the at least one computer processor via the first trained ML module using the respective second set of second link specifications and the second logical link present in the second data field;

transferring, by the at least one computer processor, a linked data item stored in the second data field to the first data field, wherein the first data field comprises the linked data item after the transferring, and wherein the linked data item transferred to the first data field comprises the first logical link and the second logical link with the additional second data field;

modifying, by the at least one computer processor, a data format of the retrieved one or more data items, by comparing a data format used in the identified second data fields for storing the one or more data items with a data format used in the identified first data fields for storing the one or more data items; and storing, by the at least one computer processor, the one or more data items having the modified data format in the identified first data fields.

15. A non-transitory computer-readable storage medium comprising a first database, the first database comprising first procedure specifications of first procedures and a first data field for storing data items, the first data field comprising first logical links within a first data structure of the first database, each of the first logical links comprising a respective first set of first link specifications, the computer-readable storage medium having instructions stored thereon that, when executed by at least one computing device, cause the at least one computing device to perform operations comprising:

receiving a second data structure of a second database and a second procedure specification of a second procedure, the second data structure comprising a second data field storing second data items, the second data field comprising a second logical link within the second data structure of the second database, the second logical link comprising a respective second set of second link specifications, wherein the second procedure is configured to retrieve the second data items stored in the second data field upon execution by the at least one computer processor configured to control the second database;

determining a second semantic link between the second procedure specification and the second data field, wherein the second data field shares the second logical link with an additional second data field, and wherein the second logical link corresponds to the second data field;

determining a first semantic link between the first procedure specification and the first data field, wherein the first procedure specification corresponds to the second procedure specification, wherein the first logical link corresponds to the first data field, and wherein a first link specification of the first logical link matches a respective second link specification of the second logical link;

identifying, via a first trained machine learning (ML) module, one or more of the first data field in a the first data structure of the first database comprising the first procedure specification using one or more logical links of the second database and the procedure specification of the second database, wherein the identifying the first data fields is executed by the at least one computer processor via the first trained ML module using the respective second set of second link specifications and the second logical link present in the second data field;

transferring a linked data item stored in the second data field to the first data field, wherein the first data field comprises the linked data item after the transferring, and wherein the linked data item transferred to the first data field comprises the first logical link and the second logical link with the additional second data field;

modifying a data format of the retrieved one or more data items, by comparing a data format used in the identified second data fields for storing the one or more data items with a data format used in the identified first data fields for storing the one or more data items; and storing, via the at least one computer processor, the one or more data items having the modified data format in the identified first data fields.

\* \* \* \* \*